United States Patent
Rajagopal et al.

(10) Patent No.: US 9,461,982 B2
(45) Date of Patent: *Oct. 4, 2016

(54) DISPOSABLE BROWSERS AND AUTHENTICATION TECHNIQUES FOR A SECURE ONLINE USER ENVIRONMENT

(71) Applicant: AUTHENTIC8, INC., Mountain View, CA (US)

(72) Inventors: Ramesh Rajagopal, Los Altos, CA (US); James K. Tosh, Fremont, CA (US); Fredric L. Cox, San Jose, CA (US); Perry F. Nguyen, Santa Clara, CA (US); Jason T. Champion, Mountain View, CA (US)

(73) Assignee: Authentic8, Inc., Mountain View, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 14/325,128

(22) Filed: Jul. 7, 2014

(65) Prior Publication Data
US 2014/0325589 A1  Oct. 30, 2014

Related U.S. Application Data

(63) Continuation of application No. 13/076,421, filed on Mar. 30, 2011, now Pat. No. 8,776,169.

(60) Provisional application No. 61/319,250, filed on Mar. 30, 2010.

(51) Int. Cl.
*H04L 29/06* (2006.01)
*G06F 21/31* (2013.01)
(Continued)

(52) U.S. Cl.
CPC .............. *H04L 63/08* (2013.01); *G06F 21/31* (2013.01); *G06F 21/313* (2013.01); *G06F 21/35* (2013.01);
(Continued)

(58) Field of Classification Search
CPC ..... H04L 63/08; H04L 63/168; H04L 63/20; H04L 63/1416; H04L 63/145; H04L 69/329; H04L 67/34; G06F 17/3089; G06F 21/50; G06F 21/62; G06F 707/99935; G06F 2221/2119; G06F 21/6236; G06Q 30/06
See application file for complete search history.

(56) References Cited

U.S. PATENT DOCUMENTS 6,138,168 A   10/2000   Kelly et al.
6,704,024 B2   3/2004   Robotham et al.
(Continued)

OTHER PUBLICATIONS

PCT/US2011/030620, Search Report and Written Opinion of the International Searching Authority mailed Aug. 23, 2011.
(Continued)

*Primary Examiner* — Saleh Najjar
*Assistant Examiner* — Shu Chun Gao
(74) *Attorney, Agent, or Firm* — Baker & MacKenzie LLP

(57) ABSTRACT

Disclosed herein are systems and methods that allow for secure access to websites and web-based applications and other resources available through the browser. Also described are systems and methods for secure use and retention of user credentials, as well as methods for dynamic authentication of users and integrity checking of service providers in online environments. Thus, described in the present specification are systems and methods for constructing and destroying private, secure, browsing environments (a secure disposable browser), insulating the user from the threats associated with being online for the purposes of providing secure, policy-based interaction with online services.

26 Claims, 9 Drawing Sheets

(51) Int. Cl.
*G06F 21/35* (2013.01)
*G06F 21/36* (2013.01)
*G06F 21/43* (2013.01)
*G06F 21/53* (2013.01)

(52) U.S. Cl.
CPC .............. *G06F 21/36* (2013.01); *G06F 21/43* (2013.01); *G06F 21/53* (2013.01); *H04L 63/20* (2013.01); *G06F 2221/2111* (2013.01); *H04L 63/168* (2013.01)

(56) References Cited

U.S. PATENT DOCUMENTS

| | | | |
|---|---|---|---|
| 7,934,253 B2 | 4/2011 | Overcash et al. | |
| 7,958,012 B2 | 6/2011 | Hudak et al. | |
| 8,266,685 B2 | 9/2012 | Abzarian et al. | |
| 8,484,718 B2 | 7/2013 | Chacko et al. | |
| 2003/0229810 A1* | 12/2003 | Bango | G06F 21/56 726/24 |
| 2004/0239681 A1* | 12/2004 | Robotham | G06F 3/14 345/581 |
| 2005/0021668 A1* | 1/2005 | Beesley | H04L 63/1416 709/217 |
| 2006/0005008 A1 | 1/2006 | Kao | |
| 2006/0041755 A1 | 2/2006 | Pemmaraju | |
| 2006/0232592 A1* | 10/2006 | Faso | G06F 21/567 345/530 |
| 2007/0016949 A1* | 1/2007 | Dunagan | G06F 21/51 726/22 |
| 2007/0101435 A1* | 5/2007 | Konanka | G06F 21/52 726/27 |
| 2008/0016551 A1* | 1/2008 | Pinkas | H04L 63/083 726/2 |
| 2008/0271020 A1* | 10/2008 | Leitz | G06F 21/31 718/1 |
| 2009/0292984 A1* | 11/2009 | Bauchot | G06F 17/30896 715/234 |
| 2010/0024036 A1 | 1/2010 | Morozov et al. | |
| 2010/0057836 A1 | 3/2010 | Anbuselvan | |
| 2010/0319070 A1* | 12/2010 | Born | G06F 21/51 726/23 |
| 2011/0161990 A1 | 6/2011 | Smith et al. | |
| 2011/0247045 A1 | 10/2011 | Rajagopal et al. | |

OTHER PUBLICATIONS

"Tab (GUI: Difference between revisions)." Wikipedia. Wikimedia Foundation, published Apr. 19, 2009. Accessed Web. Apr. 18, 2014. <http://en.wikipedia.org/w/index.php?title=Tab_(GUI)&DIFF=284321974&OLDID=283>.

"Internet Explorer 7—Wikipedia, the free encyclopedia." Wikipedia, the free encyclopedia. Published, Apr. 9, 2009. Accessed—Web. Oct. 10, 2013, <http://en.wikipedia.org/w/index.php?title=Internet_Explorer_7&oldid=282788819>.

PCT/US2014/024867, Search Report and Written Opinion of the International Searching Authority mailed Sep. 5, 2014.

* cited by examiner

| Name | URL |
|---|---|
| Gmail | https://www.google.com/accounts/ServiceLogi... |
| Facebook | https://www.facebook.com/ |

Settings:

The Settings link on the bottom right allows you to view your login history, change your A8 password or change the trust settings of the computers you use to connect to Authentic8.

Support:

The User Guide is a great place to start. It may already contain the answer to your question.

The User Forum is also a great place to get help. Someone else has probably had the same question - try it!

Telephone: 650-555-6139
9:00 AM to 6:00PM Monday thru Friday
(Pacific Time)

Email: support@authentic8.com

Authentic8.com  OSMoSis Blog  User Forums  User Guide

©2011 Authentic8 | Privacy Policy | Terms of Use | Copyright Policy    Settings

*FIG. 5*

| | File Edit View History Tools | |
|---|---|---|
| | 🔲 Authentic8 Start Page ✕ | 🗋 userguide 2-17-11 ✕ | 🗋 a8:/userguides.html#2 ✕ | 🔲 Settings ✕ | ⊕ |

Settings

Info

Login History

| Login Date | Computer | Duration | Trusted | Logged in |
|---|---|---|---|---|
| Tue Mar 29 2011... | DM - Latitude E6400 | - ... 20m | yes | yes |
| Tue Mar 29 2011... | DM - Latitude E6400 | - ... 23m | no | no |
| Tue Mar 29 2011... | DM - Latitude E6400 | - ... 9m | yes | no |

My Computers

Edit Auth

Last account activity: 31 minutes ago, from DCM

© Authentic8 | Privacy Policy | Terms of Service

*FIG. 6*

DISPOSABLE BROWSERS AND AUTHENTICATION TECHNIQUES FOR A SECURE ONLINE USER ENVIRONMENT

CROSS-REFERENCE TO RELATED APPLICATIONS

This application is a continuation application of U.S. application Ser. No. 13/076,421, filed on Mar. 30, 2011, now U.S. Pat. No. 8,776,169, which application claims the benefit of Provisional Application No. 61/319,250, filed Mar. 30, 2010, both of which applications are herein incorporated by reference in their entirety.

BACKGROUND

Consumers are increasingly conducting important and sensitive business and other activities online; whether they are banking, paying bills, communicating with healthcare providers and other online service providers. With all of the confidential information communicated through web browsers online, consumers are accordingly vulnerable to theft of their identifying information through infected or otherwise compromised web browsers and through hijacked connections and spoofed destinations. Also, since consumers have difficulty in remembering and managing login credentials for the service providers they use, they set usernames and passwords that may be easy to recall and can be the same across all accounts, so access to one username and password pair might provide a thief with access to multiple of the users' accounts. Theft of login credentials, personal information, money, healthcare data, are all possible results. The range of risks is growing, and current secure browsing and authentication approaches do not satisfactorily address the need for complete security to ensure a safe online experience.

SUMMARY

Disclosed herein are systems and methods that allow for secure access to websites and web-based applications and other resources available through the browser. Also described are systems and methods for secure use and retention of user credentials, as well as methods for dynamic authentication of users and integrity checking of websites in online environments. Thus, described in the present specification are systems and methods for constructing and destroying private, secure, browsing environments (a secure disposable browser), insulating the user from the threats associated with being online for the purposes of providing secure, policy-based interaction with online services.

Once a user has been authenticated through techniques described in this application, the user's activities are then carried out and protected within the secure service environment as described further below, the effect of which is to remove the user's machine from being directly exposed and vulnerable to the public internet. Within this secure service environment, the user is able to conduct a full spectrum of activities. Once a session is ended, all user-identifiable attributes and information can be disposed of. At the user's option, such information may be maintained in separate secure storage to be re-instantiated in a new session when they log in from the same or another client machine.

The advantages of the secure service environment, a component of which is a secure disposable browser as described below, comprise at least the following four facets—security, pre-configurability, policy control, and disposability. With regard to security, the disposable browser runs within a secure "jailed" environment within the secure service environment. All of the browser code is processed within the secure service environment and not on the local client machine. Through this approach, the service renders only images of web pages on a user's machine, while keeping the code-rendering engine at the secure service environment, dislocated from the user and the user machine. This process of dislocating the execution of web code from the user display of the web page enables security scanning and malware handling at the secure service environment, and prevents malware from reaching the end-user machine through often-vulnerable local machine-resident web browsers.

With regard to the pre-configurability of the secure disposable browser, a system is in place to maintain key elements of the user's profile (with their consent/selection of this option) and instantiates those key elements when the user requests a new disposable browser session. The new disposable browser session accordingly may be populated with merchant accounts, user credentials, user bookmarks/favorites, browser histories, plug-ins, extensions, and session states associated with the user's previous disposable browser session(s).

Regarding the policy control element of the secure disposable browser, this provides a framework for enabling an authorized party to establish use policies for how the browser is used by the user. Authorized party includes the users themselves, parents, IT administration personnel, and others. Policies can include access rules, content filtering, authentication, data handling (upload/download, print), session tracking, logging, monitoring, private browsing (cookie handling, IP masking and the like), validation of downstream sites, time- or geography-based rules, and rules governing access machines, etc.

Regarding the disposability of the secure disposable browser, this relates to building from scratch, per user, per session, all aspects of a disposable browser session and then disposing of all bits at session termination. At the option of an authorized party or according to policy, session and other data can be stored in the secure environment to be accessed later.

For authentication of users, the disclosed systems and methods use dynamic authentication techniques that are adaptable according to a user's configured profile with the system as well as environment variables around which a user (or someone purporting to be the user) presents himself or herself or interacts with the secure service environment. In conjunction with the described secure browsing environment, the combination of all these features provide a synergistic combination of techniques that ensures online security.

Further disclosed herein are systems and methods to check integrity of downstream destinations, where integrity comprises things such as validating the identity of a downstream site, ensuring that the downstream site is free of malware, assessing the reputation of a site with respect to privacy, etc. When the integrity of a downstream site is questionable, the user can be provided with an option for how to interact with that site—for instance the user might be able to proceed using a "safe" or reduced-functionality website within the secure disposable browser, decline to go to the site, or provide reduced information and/or credentials when interacting with the site.

Also disclosed are techniques for asynchronously changing a user's attributes (e.g., user name, password, or email) with an online service provider without the user needing to be actively involved in the process or even aware of its timing. By periodically changing a user's password and/or email address to something very random and strong, the effect of any single compromise of a user's online account can be greatly diminished.

Another disclosed embodiment provides for a secure email function within the secure service environment where users can receive email messages from their selected website services. These messages are delivered to the user via a customized email address associated with the secure service environment that allows validation of the messages prior to access by the user.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components be omitted in certain figures for clarity of discussion. Reference is now made to the following descriptions taken in conjunction with the accompanying drawings, in which:

FIG. 5 illustrates an exemplary "home page" screen a user might see when interfacing with the secure service environment;

FIG. 6 illustrates a user's history, login names, computer names, durations and other relevant status histories for their access to the secure service environment.

These exemplary figures and embodiments are to provide a written, detailed description of the inventions set forth by any claims that issue from the present application. These exemplary figures and embodiments should not be used to limit the any claims that ultimately issue in a patent from the present application.

DETAILED DESCRIPTION

Figure 1:
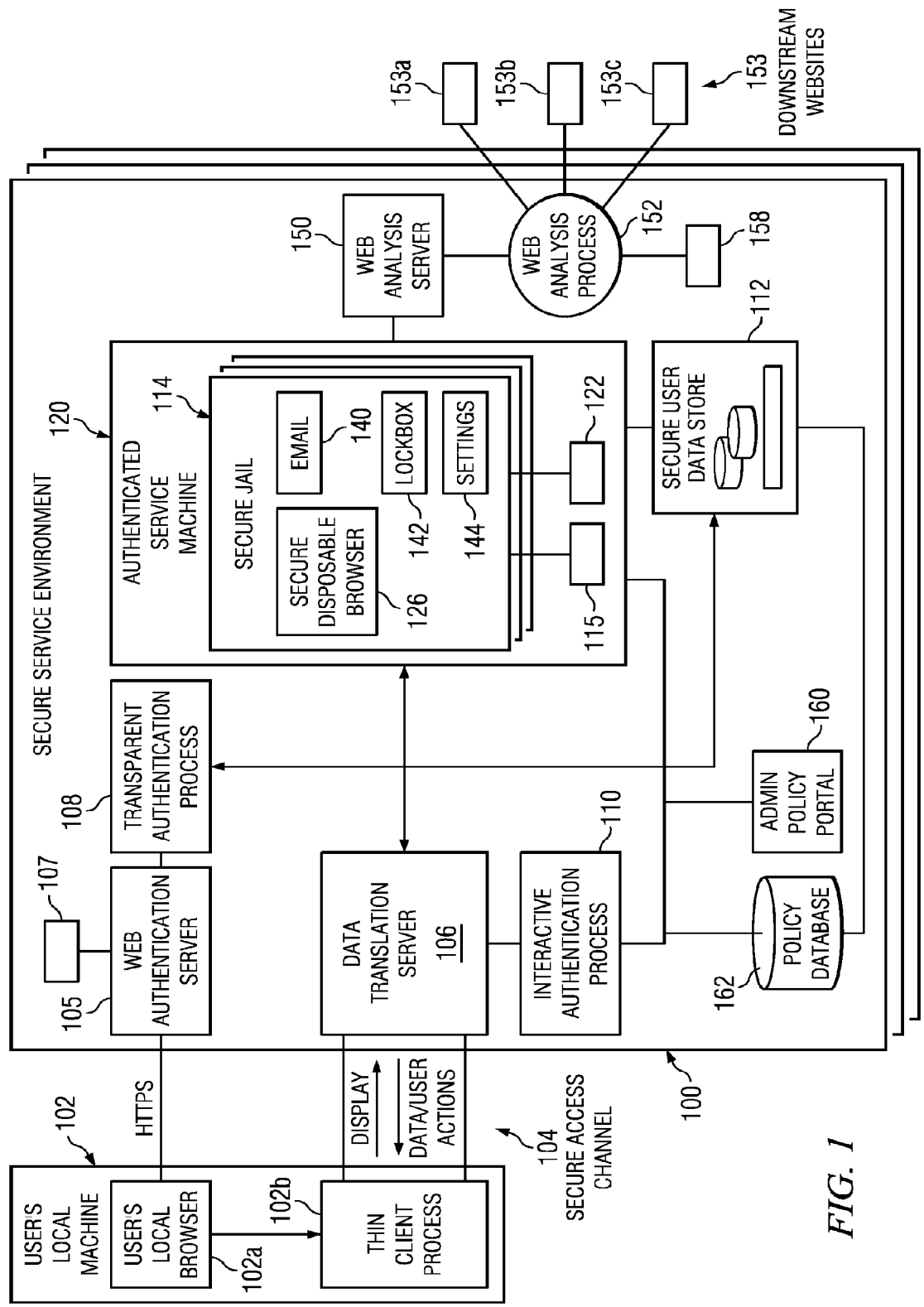
FIG. 1 illustrates a high-level service architecture for providing a secure disposable browser within a private user environment within the secure service environment.

FIG. 1 is a high-level diagram generally describing the user interaction and back-end operations of the secure service environment 100. After authentication, which is described further below, a secure disposable browser 126 is constructed within the secure service environment 100, which is operated securely and remotely from the end user's (potentially compromised) local machine 102. The secure disposable browser 126 is termed "disposable," because it is constructed at the initiation of a browsing session and destroyed at the end of a browsing session (along with any session or other data that the user does not wish to persist).

User credentials and other personal information are stored and accessed entirely within the secure service environment 100 and are never shared with the user's local machine 102. Through this approach, when the user visits downstream websites 153, all web code is delivered to and executed within the secure disposable browser 126, itself within a private user area or secure jail 114 operating on an authenticated service machine 120 within the secure service environment 100.

The web code received by the secure disposable browser 126 within the secure service environment 100 is translated using a network and application protocol and delivered (via a data translation server 106) to the end user's local machine 102 as encrypted display data over a secure access channel 104. The thin client process 102B on the end user's local machine 102 decrypts and renders this data to the user as an image of the browser running within the secure service environment 100.

Operating through this system, user-generated inputs (keystrokes, mouse input, etc) are transmitted back to the data translation server 106 via the same network and application protocol (as described above) over the secure access channel 104 and accordingly to the secure disposable browser 126, which then passes those inputs back to the original website to deliver a user's interactions with that downstream website 153. The secure disposable browser 126 is built per user on-demand, and it is therefore free of malware at initiation. Any malware that is encountered during a web session with a downstream website 153 can be handled by security applications operating at the secure service environment 100. Since the secure service environment 100 handles such web interactions on behalf of multiple users, it can use collective intelligence gathered thereby to effectively combat malware at malicious websites and detect and prevent access to known malicious sites. Upon session completion, the secure disposable browser 126 and all transient session data may be purged.

Still referring to FIG. 1, to maintain the security of a user's access to his or her personal data and web applications through the secure service environment 100, the user must be first adequately authenticated. That authentication process will now be described. The user may access the secure service environment 100 initially through a standard local browser 102A running on the user's local machine 102, via an encrypted HTTPS connection, connecting to a web authentication server 105. The web authentication server 105 operates code comprising computer instructions stored on a computer-readable medium 107. The computer instructions comprise instructions for conducting a transparent authentication process, which when operational comprises process 108.

The transparent authentication process 108, which will be described in greater detail below, uses various clues to set the confidence interval around the user access attempt. Generally speaking, various environmental parameters regarding the user's access attempt are deemed to be either consistent or inconsistent with expected parameters for that user. Access using a user's known or trusted local machine, during a usual time, from a typical geographical location and with consistent hardware and software parameters etc., will yield a higher level of confidence around the authenticity of the user's access attempt.

Once the transparent authentication process 108 is completed, the user is provided with a secure disposable browser 126 within a secure user environment (or secure jail 114) by an authenticated service machine 120 within the secure service environment 100. The interactive authentication process 110 can now be run with computer instructions stored in the computer-readable medium, secure user data store 112. The interactive authentication process 110 employs user-customized and/or defined processes, which may also be stored, in part, in the secure user data store 112. Upon a successful authentication, the user is provided with authenticated access to the secure disposable browser 126. Each user is given their own secure disposable browser 126 within a secure jail 114 such that each user's personal information and disposable browser application is insulated from each other user's, and the jail is also a part of a computer-readable medium 115 contained within the authenticated service machine 120 for storing multiple such user environments or secure jails in a secure and isolated fashion. Once successfully completing the authentication processes 108, 110, the user through their local machine 102 is connected to the secure disposable browser 126 operating within a secure jail 114 running in the authenticated service machine 120, which similarly operates computer code stored with computer-readable instructions stored on a computer-readable medium 122.

One set of instructions operated by the authenticated service machine 120 establishes a secure disposable browser 126 within a per user secure jail 114 in the secure service environment 100. The secure disposable browser 126 instruction codes are also stored in computer-readable medium 122 or on another computer-readable medium. Although the secure disposable browser 126 appears as a window display on the end user's local machine 102, it is actually operating within a secure jail 114 on an authenticated service machine 120 within the secure service environment 100. Accordingly, the secure disposable browser 126 insulates the end user from the vulnerabilities that are associated with user's local machine-resident browsers which are directly exposed to web code on the internet. Coupled with the advantageous authentication techniques described herein, the secure service environment 100 provides greatly enhanced security relative to known solutions, and once a user is operating within the secure service environment 100, he or she is able to securely perform any of a number of additional tasks securely, and the service is able to provide coordination of the users' access to multiple secure websites, including e-commerce, banking or healthcare websites or conduct any other online activities deemed sensitive.

To provide secure storage and access to user account information and user data, a secure user data store 112 communicates securely over an encrypted network with the authenticated service machine 120. The secure data store 112 contains user-specific information that supports the functionality within the secure disposable browser 126. This includes data to authenticate to and access the secure service environment 100 as well as downstream websites 153, customize the disposable browser 126 with user specific preferences (including accounts, favorites, bookmarks, history etc) as well as to support other applications within the secure disposable browser 126, such as a secure mail portal 140, a document lockbox 142, and a reports and settings configuration application 144, all of which are applications executable by the authenticated service machine 120 when retrieved from an associated computer-readable medium, such as computer-readable medium 122. Further regarding access to downstream websites 153, the secure service environment allows for fetching of the credentials from the computer-readable medium 122 to allow for the user to login to their downstream website accounts. The secure service environment then further provides a secure disposable browser such that on the user's remote client, they would see their service web interface presented to them on a tabbed window.

Regarding the secure email portal 140, the disclosed system and method provides the ability to replace the user's email address on record with downstream service providers with an obscured and non-identifiable (yet user- and vendor-unique) email address controlled by the secure service environment 100. This results in emails from a service provider arriving at this secure, hosted email portal 140. The disclosed system and method thereby ensures the validity and authenticity of the email messages from each provider. The analysis of the validity and authenticity of email messages can include analysis of the sending server from where the message originated (domain to IP matching) as well as examining the integrity of message metadata to ensure authenticity. Users can then use the email portal 140 to manage their sensitive email communications with these chosen downstream websites 153. The secure email portal allows for different logical displays, including chronological or by service provider. The users can be informed of new messages in their secure portal inbox by sending notification emails to their personal email account, via an icon on their local machine 102, or via SMS to their mobile phone or other method.

Regarding the document lockbox 142, the disclosed system and method provides for interaction with the print/download functionality within web applications to offer the user convenient one-click view, print, save and search-enabled access functionality within the secure service environment. A user is accordingly able to view a document within a web application, "print to" PDF or similar transportable format and launch a viewer to physically print, or save to the document lockbox memory, which is a hosted and encrypted archive for statements/documents within the secure service environment 100 that the user can access and retrieve at times of their choosing. Users can annotate or add commentary to any document and have a logical view of their statements/documents by period or service provider. The service can also enable ingestion of other scanned documents into this lockbox via an upload mechanism from the user's machine or other local data store. Users may also be able to share documents with other users that are registered with the service. In this instance, a user may provide access and/or edit privileges to another user, enabling saved documents to be shared with a user or multiple user, without those documents being publically available or stored locally on any end user machine.

Further, because the secure service environment 100 is operating on behalf of multiple end-users through the secure disposable browser 126, it is able to use collective intelligence to detect and protect users from fraudulent and/or harmful websites, or those with questionable reputation that are being accessed through the secure disposable browser 126. This collection of integrity protections would flow through another web analysis server 150 which would perform a downstream web server analysis process 152 to determine that a downstream website 153 is (a) what it purports to be through composite examination of its certificates, its IP addresses, and other detectable metrics, (b) free of malware by implementing heuristics and signature based malware scanning techniques and (c) reputable with respect to industry best-practices for tracking user identifiable information and behaviors via use of cookies and other tracking identifiers. These applications would be stored as computer code comprising computer executable instructions stored on authenticated service machine memory 122 or downstream web server memory 158.

To increase the security of users' website credentials, the an asynchronous reset machine 170 is operable to periodically change/reset the user's credentials with various downstream website destinations at the user's option. The change could be implemented as often as each visit to a downstream destination, and it can happen in an automated way and asynchronously, meaning that the user will not need to be actively engaged for the service to login on the user's behalf and reset their credentials.

For example, the asynchronous reset machine 170 and method can produce a randomly generated string for each site that meets the site-specific maximum field lengths and parameters for a strong credential. The user will be able to select how frequently they wish to have these credentials changed by the service, one time, or continuously (at a defined interval). Credentials to be changed can include the username & password pair to access the site as well as the email address on record with each site or service provider.

Still referring to FIG. 1, another disclosed embodiment in the present disclosure relates to providing usage policies per a policy database 162 and policy admin portal 160. These usage policies can be set by system administrators on behalf of one or multiple employees, by parents on behalf of one or more children, or otherwise by a one person on behalf of a group of people. Some or all of such policies can also be enabled and individually maintained by the users themselves according to their desired settings. Policies can be enforced globally for all actions taken from the disposable browser, or on a per account basis to give more fine-grained control over usage for particular online accounts. E.g. "log me out of all accounts after 5 minutes of inactivity", "force out-of-band authentication whenever I access www.mybank.com", "only allow access to www.mybank.com when I'm coming from my home IP". Particularly as the secure service environment 100 may be employed in a centralized, cloud-based environment, the setting of usage policies on behalf of multiple users by an administrator is easily facilitated, including the setting of usage policies, e.g., on a per-site basis or according to other defined user groups. These usage settings can be established by an admin or parent or other party with admin rights through the admin policy portal 160 communicating with the policy database machine 160. In the event that a user is configuring his or her own policies, this admin policy portal 160 can be accessed from within their secure disposable browser 126 connecting to the secure service environment 100 and in turn to the admin policy portal 160 over the secure access channel 104.

Figure 2:
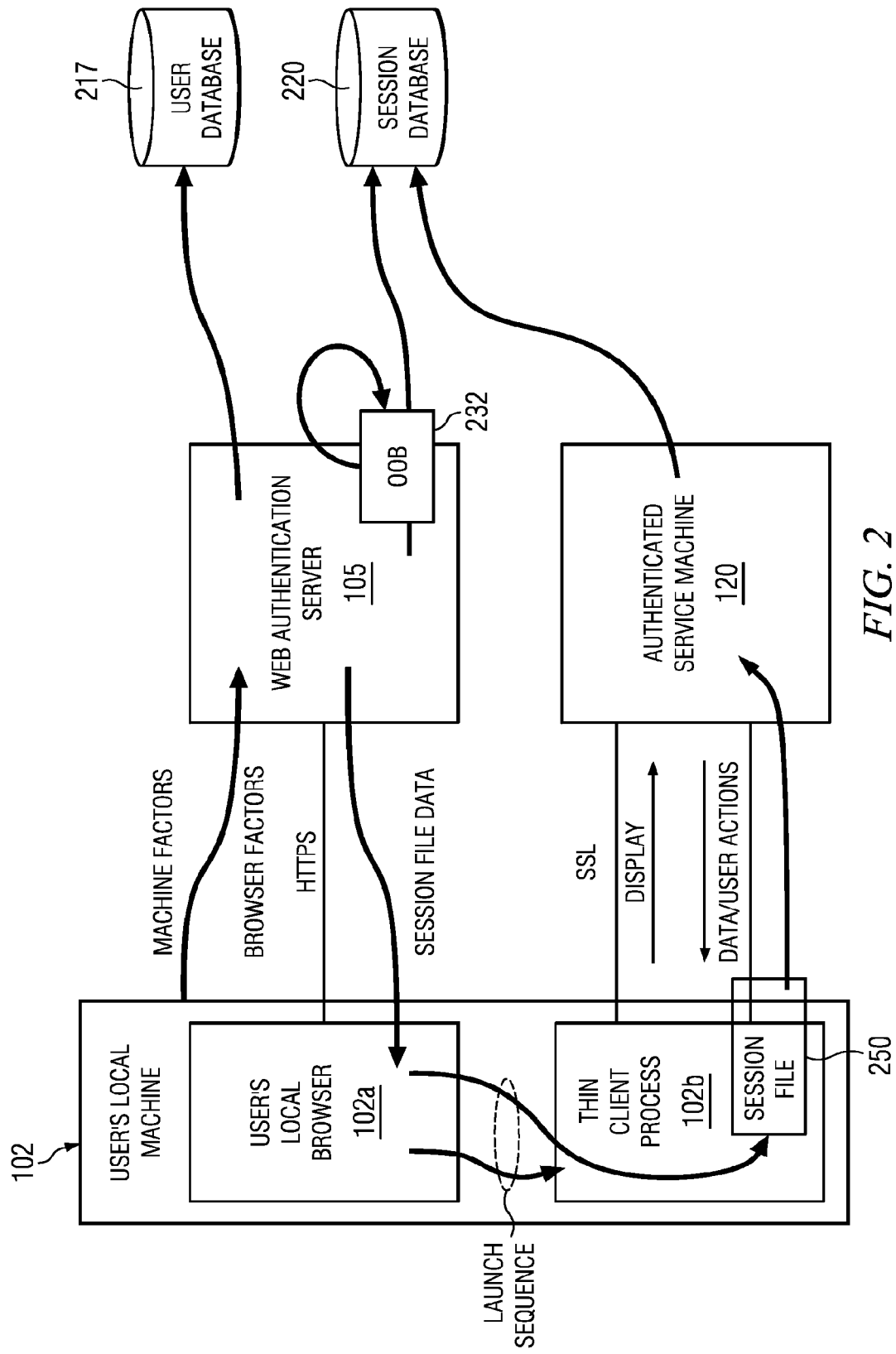
FIG. 2 illustrates a system for establishing an authenticated user session and a secure disposable browser session in communication with a user's local machine.

Illustrated in FIG. 2 is another, functional-level view of the secure service environment 100 of FIG. 1. This figure illustrates the interaction between some of the system elements described in FIG. 1. While there are certain elements shown in FIG. 1 that are not illustrated in FIG. 2 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification.

Within the secure service environment 100 is a web authentication server 105 that provides for a user to connect to the secure service environment 100 for the purposes of initiating a log in process, user and machine identification purposes, user-factor checking, browser-factor checking, machine-factor checking, and session-factor checking. For storing the various factors, a master list of profile data is stored in a user database 217, which is a component of the secure user data store 112. The web authentication server 105 is in communication with various sub components of the secure user data store 112. The user login attempt can made through the user's local machine 102, typically via the user's local browser 102a. When receiving a login attempt, the web authentication server 105 will reference the user database 217 and the session database 220 to cross-check data gathered during the login process, including authentication factors, from the login session against that stored in the database.

In the described approaches, at least some of the particular factors can be gathered from characteristics of the user's local machine 102, as will be further described below. As illustrated in FIG. 2, this system diagram provides another, consistent system view of the system illustrated in FIG. 1. As illustrated in FIG. 2, the web authentication server 105 is primarily responsible for responding to and handling requests to initiate the login process and brokering the transparent authentication process 108, whereas authenticated service machine 120 is primarily responsible for accepting the incoming connection request, performing the interactive authentication process 110, and managing the per-user jailed environment which contains the secure disposable browser 126 (see FIG. 1). As described above, this secure disposable browser 126 does not store user data on the user's local machine 102, so in conjunction with the described authentication techniques this method and system provides a high level of security for user credential data and other user data.

As a part of the above-described authentication process, when a user logs in to the secure service environment 100, the web authentication server 105 executes the login request against a hierarchy of authentication techniques, referencing the user factors previously stored in the user database 217, which is part of the secure user data store 112, with the aim of confirming the user's true identity (or detecting an imposter).

Initially, the web authentication server 105 examines factors associated with the user's login attempt using techniques that are transparent to the user. This enables the secure service environment 100 to place a preliminary "confidence interval" around user identity, where "confidence interval" refers to a certain degree of confidence that the user is who he or she purports to be and the extent to which the user's local machine 102 is recognized as being associated with the user's account, or possibly modified since previous login attempts. Depending upon this initial level of confidence, the web authentication server 105 can determine whether and what further transparent and/or non-transparent information is required from the user or the user's local machine 102.

Types of transparent information that can be garnered from a user's login attempt, such as through the session information gathered from the connection to the user's local machine 102, include browser factors, machine factors, and session factors, as further described below.

Browser Factors.

Browser-related parameters that allow identification of user's local browser 102a, resident on the user's local machine 102 from which the login process is being initiated. Examples of such browser factors include: browser plug-in details, user agent, system fonts, cookies, super cookies, color depth, screen size and more. Many other factors associated with a particular browser revision or configuration can be detected, analyzed, and cross-checked against the user database 217.

Machine Factors.

Specific attributes of the user's local machine 102 can be identified including by placing a unique digital certificate on the user's local machine 102. Particular aspects intrinsic to the user's local machine 102 can also be detected, including software and hardware components and serial numbers (e.g. MAC address, OS fingerprint, client application serial numbers, etc.). These various aspects can be detected directly or they can be built into an encrypted hash derived from a combination of these various factors. This information can be previously stored and then compared for authentication purposes against information within the user database 217.

Session Factors.

A collection of session-related parameters can be detected and further used to identify and corroborate the user's identity. For example, IP address data can be used to determine the user's geographic location, and this location can be checked against expected user location according to static and/or dynamic information (user home bases, user travel patterns, possible travel patterns, etc.) stored in the user database 217 and associated with the user.

In addition to the above-described factor analysis, the secure service environment 100 can establish behavioral norms for the user, and is therefore further capable of checking for behavioral abnormalities as a part of the identification and authentication process. Indicators can include a user's typical login location, typical access device, time of day, or even a typical behavior pattern regarding activities on downstream sites, etc. Other available indicators incorporate logical assumptions that can be inferred from looking at recent activities such as change in login frequency, logging in from a different location over a short period of time, cross-checking the location of a user's computer against that of the user's mobile phone, and more.

Further beyond the browser/machine/session factors and the detected behavioral norms, the secure service environment 100 allows users (or admins on behalf of multiple users) to establish their own prescribed behavioral rules that can be reflected within the authentication framework, e.g., "I never log in from a public machine," "I rarely travel," "I'm a road warrior," "these are the only locations that I might log in from," "I'll never log in from abroad," "I'll never log in during these hours" Behavioral norms may be defined and applied as global policies, or can be defined and applied on a per-downstream website basis, establishing a policy specific to a particular website account or destination site, e.g., "only allow my home machine to connect to this bank account." etc. These policies are set in the policy database 162 described in FIG. 1 and in accordance with the portals and methods described in the description of this aspect of FIG. 1. The resulting identification and authentication techniques result in a dynamic process in which authentication may vary time over time, based on the composite result of service rules, deviation from user behavioral norms and user customized policies.

If transparent authentication can not be accomplished or if one or more of the behavioral norms is violated, or as a condition of policy further validation of the user is required, additional steps can be presented to the user. An example of when and how these steps might occur is when a known user on an unknown user machine 102 is presented to the secure service environment 100. In this case the secure service environment 100 will lack the historical information to authenticate/identify the user. In this event, other methods can be used depending on the circumstances. In the event that the user is known, via factors supplied to the web authentication service 105, but the user's machine 102 is unknown or not considered "trusted", where trusted refers to a previous configuration setting performed either by the secure service environment 100 or the user themselves instructing the secure service environment 100 to trust this machine, thereby enabling login using standard authentication methods without additional validation due to hardware or configuration changes, the secure service environment 100 can use out-of-band communications 232 to validate the user. Such out-of-band communication techniques include sending a text message to the user's registered mobile phone. The text message would deliver a randomly generated code for the user to enter into the web authentication server 105 via their local browser 102A to "validate" himself or herself. Another out-of-band approach 232 would be to place a phone call to a phone number registered by the user, and then similarly provide a randomly generated code for the user to enter into the web authentication server 105 via the local browser 102A. A third out-of-band technique 232 would be to use a smart phone application or "app." The smart phone app will be something the user can use to log in, register with the secure service environment 100, and/or validate himself or herself. As with regular client PCs, smart phones have hardware and/or firmware and/or location identifiers that specifically identify the equipment (phone), and those identifiers can be initially or further stored in the user database 217 for the purpose of user identification.

If most factors are correct but a few are not, the user could still be identified as "correct" if enough factors are found to establish a "confidence interval" around the attempted access. By using such a "confidence interval," the authentication process is flexible and dynamic. Thus, updated hardware that is associated with an authenticated user access could be updated into the user database 217. Thus, the secure service environment 100 can keep a collection of profiles for each user, such as a profile of the machine they accessed the service from, a profile of the browser they accessed from, which machines those browsers were associated with when they connected, what location they are connecting from, if their mobile phone location is consistent with their machine location, how many times they have failed authentication in this session prior to success, etc. The secure service environment 100 can accordingly maintain a history of these items and further analyze historical changes.

The historical changes tracked by the secure service environment 100 can be used to set an expected range of the types and frequency of changes associated with and expected from a given user. Thus, the probability that a given change is correctly associated with a given user can be determined relative to that user's historical norms and thereby can be used to help determine the confidence interval around a user's authentication session. Further, the tracking of such changes and the flexible departure from a rigid authentication scheme allows the presently described system to track changes and to accordingly allow the associated systems to change and for the adaptable authentication system to evolve with such change. If significant changes occur, the secure service environment 100 may allow the change without a separate non-transparent authentication step, but in either case, once the user is authenticated, the secure service environment 100 operates to update components of the secure user data store 112 to reflect the change.

There is a separate but related process for continuing to apply strong authentication to the user. The above description relates to the process of authentication as could be implemented to facilitate login to the secure service environment 100. But even if a malicious user should manage to get past a first level of authentication, such as by gaining access to an actual user's machine and knowing sufficient identification information for that user, certain behavior patterns may trigger an additional verification step. For example, if the system recognizes that a user typically accesses their online financial service account after 8 pm on weekdays, typically to review balances and to pay selected bills, but the secure service environment 100 recognizes activity that is anomalous to this typical behavior pattern, such as a large wire transfer, the secure service environment 100 could interrupt that transaction and prompt the user for an additional verification step.

Once the user has successfully completed the initial transparent authentication process 108, and in the event of an out-of-band 232 additional validation step that has been successfully completed, a more formal interactive user authentication 110 process is initiated. This interactive user authentication process 110 is performed within the secure confines of the secure disposable browser, 126, and is designed to provide the user the capability to authenticate themselves, by inputting their specific authentication string into the prompts provided. The process for starting the local environment that will be used to interact with the secure disposable browser 126, called the "thin client process 102b", and the act of ensuring that the data handoff from the user's local browser 102a to the thin client process 102b is secure, correct and complete, are described below. After successful completion of the transparent authentication process 108, the thin client process 102b that provides a secure connection to the secure service environment 100 is launched on the user's local machine 102. The software code operating as the thin client process 102b or another application running on the user's local machine including a Java applet or other operational code can initiate the thin client process 102b and determine if the client software is up-to-date, if components have been removed or altered, or if the client application has been compromised, or if there is anything else that needs to be installed or replaced. Next, the thin client process 102b or another application running on the user's local machine can create an authenticated session file 250 on the user user's local machine 102. In parallel, within the secure service environment 100, and within the session database 220, the user's session has been profiled, and a set of instructions on connecting from the thin client process 102b to the secure service environment 100, has been defined. This data is passed securely to the user's local machine and constitutes the bulk of the contents of the session file 250. This session file 250 contains data instructing the thin client process on which authenticated service machine 120 to connect to in order to access their secure disposable browser 126. Connection information on where to connect may include which service infrastructure to connect to in which region, which machine ID will be acting as the authenticated service machine 120, which session ID to present in order to connect to the appropriate session process, which supplemental authentication factors to present, and more.

The session database 220 is referenced by the authenticated service machine 120. The authenticated service machine 120 acts as the system which will instantiate the secure disposable browser 126 for user within a secure jail 114. The thin client process 102b connects to the authenticated service machine 120, and the secure service environment 100 can, through this connection, present interactive authentication 110 for the user, displayed via the thin client process 102b but staged and computed within the secure disposable browser 126 within the service environment 100. The connection established from the thin client process 102b to the secure service environment 100 is an encrypted secure connection. The secure connection can be through a secure socket layer (SSL) connection or other secure communications protocol, and the thin client process 102b can provide client certifications, although the client certification process can be transparent to the user because it can be installed as a part of the software delivered in order to initiate the thin client process 102b. Through this secure communication channel, there are several layers of communication/handshaking. The basic "hello" handshake is the first level, followed by a security level handshake. The secure service environment 100 can further do a security check of the thin client process 102b, or the thin client process 102b itself can run a self-certification on its own initiative or at the direction of the secure service environment 100. In fact, although the thin client process 102b is described at times herein as being separate from the secure service environment 100, it can alternatively be thought of as a part of the secure service environment 100, since it is a system element distributed as a part of the overall secure service environment 100. With this model, as well as with the additional abstractions layered in to each authentication module, as described below, the act of logging on to the service is significantly more secure than alternate systems.

In establishing the connection between the thin client process 102b and the secure disposable browser 126, the authenticated service machine 120 may access the session database 220 to ensure that a valid session request is being made. Once the validity of the session request is established, the authenticated service machine 120 will query the thin client process 102b for additional authentication factors. Once the validity of the additional factors is established, the authenticated service machine 120 will connect to the user database 217 and collect certain user profile information as pre-configuration data for setting up the user's secure disposable browser 126. Once the configuration information is collected, a secure jail 114 or secure private working environment is established within an authenticated service machine 120. That secure jail 114 is instantiated individually for each session and can be terminated (and all associated data deleted) when its associated session is ended. These secure jails 114 provide a mechanism by which a new disposable browser 126 can be created for each user session and populated with the users' configuration data, and whereby such disposable browser 126 can operate on the authenticated service machine 120, secure from the vulnerabilities of typical user machine-resident web browsers.

As a part of the system configuration, the authenticated service machine 120 establishes a queue of pre-built secure jails 114 that are fresh. When assigning these jails 114, such information is established in the jails and the jails are ready to be populated by the secure disposable browser 126, complete with user-specific or other session-specific information such as what authorization schemes the user has, what backend service providers are relevant to the user, assigning relevant data to user authentication schemes, etc. On a given authenticated service machine 120, there can be many secure jails 114 each with a secure disposable browser 126 per physical machine. As with multiple of the described machines in this specification, including the web authentication server 105 and the authenticated service machine 120, these machines can be implemented in a virtual computing environment ("cloud computing"), such as one provided by using Amazon's Elastic Cloud ("EC2") computing environment. Thus, rather than having a user-to-virtual-machine linkage, this described embodiment comprises a user-to-jail linkage, with multiple jails being assignable to each authenticated service machine 120. Further, a variety of virtual computing environments may be available in various geographic locations, across differing vendors, and the authenticated session file 250 that is delivered to the thin client process 102*b* may have specific instructions that allow the thin client process 102*b* to connect to an optimized authenticated service machine 120, that is best suited for the conditions of the user's particular session, e.g., on that is the nearest proximity to the user, on specified network infrastructure, configured with the appropriate user-specific resources, etc.

Security is provided in the secure jail by establishing a secure chroot environment, or similar type of system access control, in which a user's secure disposable browser 126 is restricted to a certain directory within the overall file system on the authenticated service machine 120. For each session, a new session ID is established for the user and is used as the identifier to establish the secure jail directory structure. The secure jail 114, associated directory and data, and secure disposable browser is disposed of after the session is complete. Thus, each user will only see a set of data that is germane to them and has been established for their current authenticated sessions. The authenticated service machine 120 has a queue of such pre-configured secure jails 114 available, and is accordingly able to assign them to users upon each session request to establish a session-specific secure jail 114, and can then create the secure disposable browser 126 within the secure jail 114 and add the user's preferences to it.

To ensure the segregation and security of the data in these jails, permissions are established as described above such that one user's data is not accessible to another user and that one disposable browser 126 cannot be compromised and be used to intercept or corrupt another user's disposable browser 126 operating in another secure jail 114 running on the same authenticated service machine 120. Further, the implementation can include independent encryption of each user's data.

To provide the element of "disposability," these secure jails are deleted at the end of each user session, and thus the ending of a secure disposable browser 126 session also results in the clearing of user data and applications associated with that browser session. Thus, although the secure user data store 112 may retain the user session settings, no such settings are stored on the user's local machine 102. Further, since the user is interacting with the secure disposable browser 126 using the thin client process 102*b* through a secure access channel 104, using a protocol that is restricted to display and user input data, the downstream websites 153 that the user is interacting with are not readily able to track user actions and user behavior. The user is controlling the secure disposable browser 126 remotely, and any cookie data, source IP data or other user identifiable factors, outside of any login credentials that may have been supplied as part of the access to the site, is obscured to the downstream website. Given that all cookie data may be destroyed at the termination of the session, and given that the user may reconnect to another secure disposable browser that would have a different source IP address, the downstream websites will only be able to track single-session behavior from a non-attributable source IP address. Accordingly, from a security standpoint and from a user privacy and data-tracking standpoint, the implementation of a disposable browser shields users from undesired consequences.

According to policies stored in the policy database 162 (see FIG. 1), various aspects of the user browser session can be stored and retained, even including the specific browser session states if desired, but they are safely encrypted and stored within the secure user data store 112.

Certain session information can be stored in the session database 220 and the user database 217 allowing the user to maintain session status, even when disconnecting and reconnecting at a later time. Depending on configuration and applicable polices as defined in the policy database 162, a user could disconnect the thin client process 102*b* from the authenticated service machine 120, but the associated jail 114 and disposable browser 126 could remain in situ. A user could re-authenticate and present the original session ID or other identifier, and start the thin client process 102*b* again from the same machine, or from another local user machine 102 or alternate type of device, such as a smart phone or a tablet computer (not shown) and re-connect to the same authenticated service machine 120, secure jail 114 and disposable browser 126. This would provide continuity to the user, allowing them to move from machine to machine, without having to re-connect to any downstream sites when reconnecting to a disposable browser 126.

Figure 3:
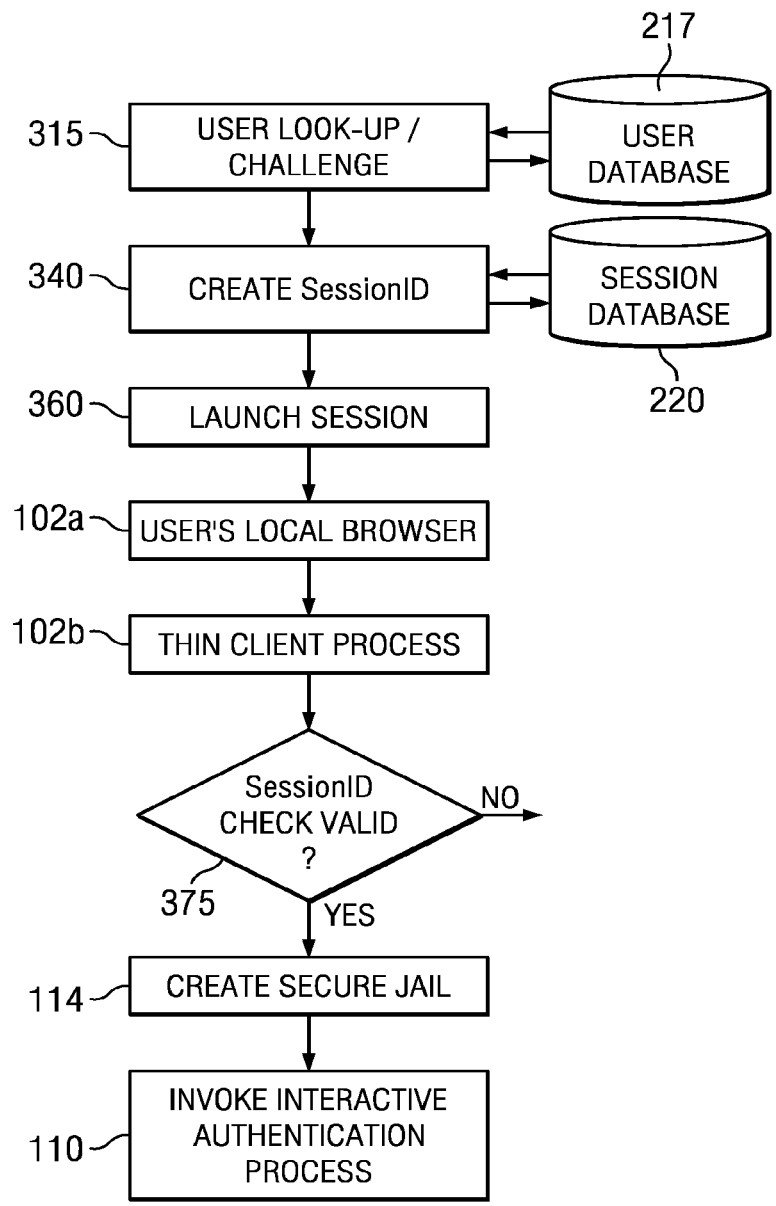
FIG. 3 illustrates a flow diagram for the authentication of a user to the secure service environment described in FIGS. 1-2 and the establishment of a secure session between them.

The program flow of the user interaction and authentication process is illustrated in FIG. 3. After transparent authentication factors are collected and validated, the authentication process transitions from an initial process conduced via HTTPS to a more formal process, where an authentication application (the interactive authentication process 110) is presented to the user within the secure disposable browser 126. The initiation of the formal authentication process begins with the launch of the thin client process 102*b*, and is illustrated in the figure in which the user's local browser 102*a* sends account data, such as a user nickname 315, in which a look-up of the account information is performed against user database 217. In response to the look-up, a User ID is returned, and a Session ID is created and associated with the User ID at action 340. In particular at action 340, the User ID is sent to the session database 220, where the session database performs checks, and returns a Session ID. Then, having assigned a Session ID in the session database 220 and associated that Session ID with the User ID, the session connecting the secure service environment 100 can be launched, and rendered by the thin client process 102*b*. This transition from an initial connection and query via HTTPS by the web authentication server 105 for performing transparent authentication 108, to remote display of the secure disposable browser 126 via the thin client process 102*b* via the secure access channel 104 is significantly different from other solutions and provides a comprehensive and secure environment for exchanging authentication credentials and interacting with downstream web sites 153.

In the described embodiments above, the initial web browser challenge 315 can be sent unencrypted or unencrypted. In processing the user look-up action, the data created or identified as a part of the above-described process includes a User ID and an associated Session ID that are created at that time. The User ID is looked up before its linking to a new Session ID, which is initially merely a new record in the session table in the session database 220.

The session database 220 may be kept unencrypted, but the User IDs used for each session are transmitted with encryption, and the User IDs are thus preserved encrypted in the back end of the secure system 100 to protect them from disclosure on the general internet. The motivation to provide this selected encryption is that it removes the incentive to try to "crack" a particular database. Thus, even if a hacker were to "crack" one database, without the other cross-referenced database access, the hacker would not be able to tell what the "cracked" data relates to. Further, each user with each provider has a different encryption key, even further limiting the scope of what could be learned by "cracking" a database.

As a part of the launch session (action 360), the Session ID is sent to the user's local browser 102a, which then starts up the thin client process 102b. Referring back to FIG. 2, there is a handoff between the user's local browser 102a and the thin client process 102b where more formal authentication activities can occur. Thus, the original user's local browser 102a authentication process only connects to the web authentication server 105, which only accesses the user database 217 and the session database 220, but nothing related to more formal user authentication or account information.

The authenticated service machine 120 is operable to validate the session ID sent to it by the thin client process 102b. In this instance, the authenticated service machine 120 connects to the session database 220 to verify the validity of the session ID received from the thin client process 102b. The validity of the session ID is determined by making an inquiry to session database 220 regarding whether the session ID currently exists and is not expired. Once the session ID is validated at action 375, the authenticated service machine 120 creates a secure jail 114 and launches the interactive authentication process 110. In other words, the foregoing steps were all directed to identification of the user—the transparent authorization process 108 identified in FIG. 1—but the interactive authentication process 110 has not yet strongly authenticated the user to fully access the secure disposable browser 126.

Figure 4A:
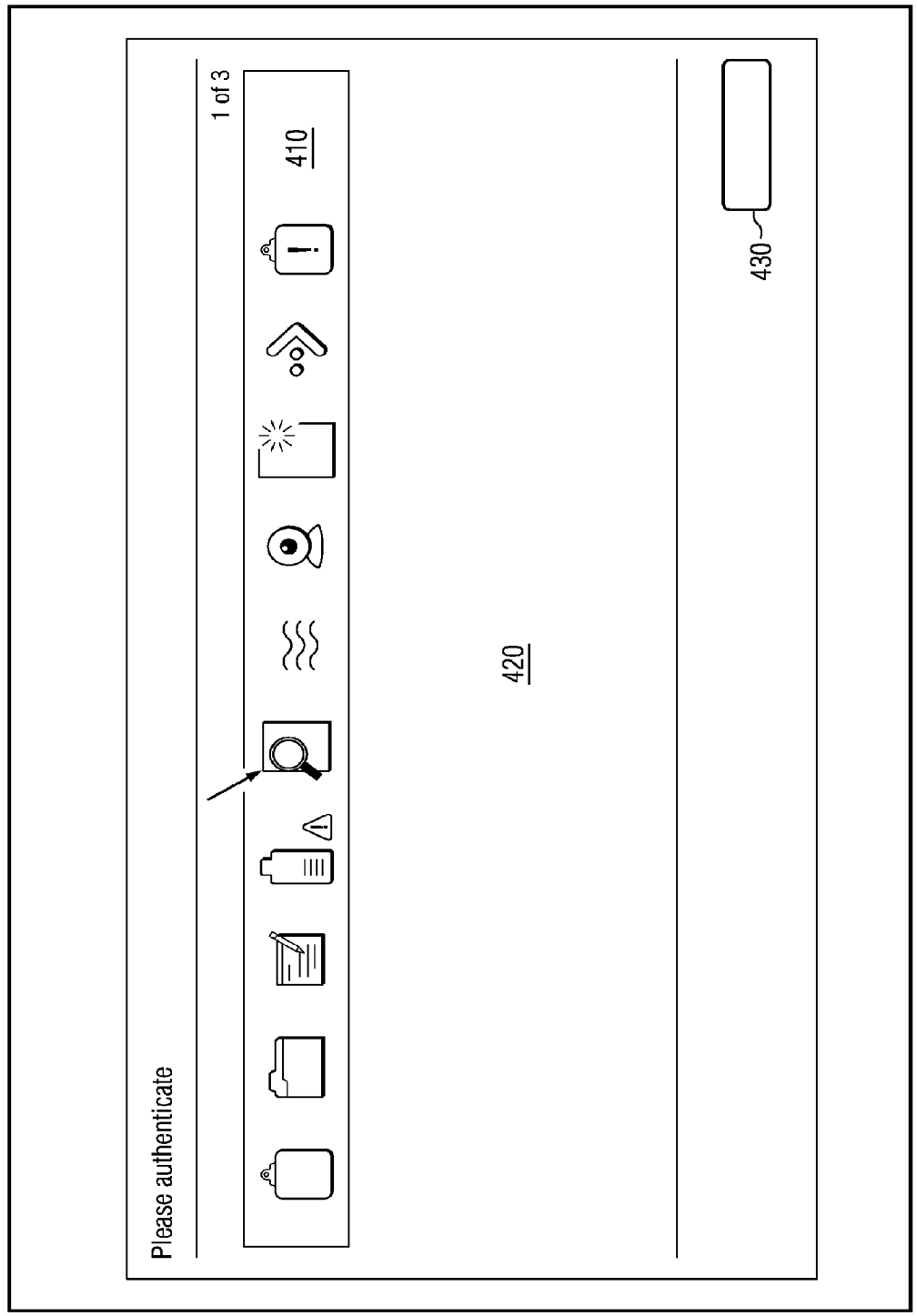
FIGS. 4A-4C provide exemplary authentication screens whereby a user can be explicitly authenticated with the secure service environment described in FIGS. 1-3.
Figure 4B:
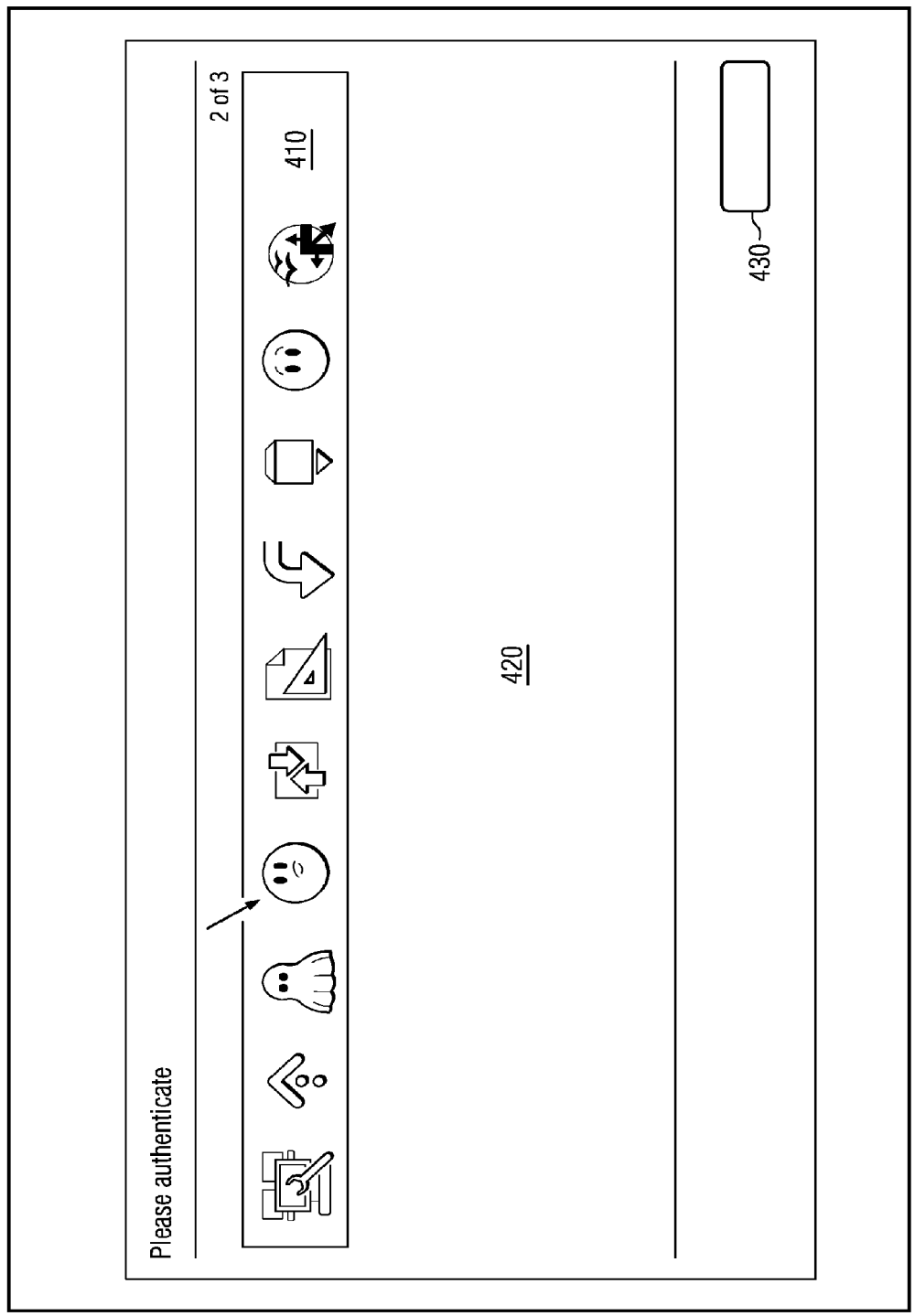
Figure 4C:
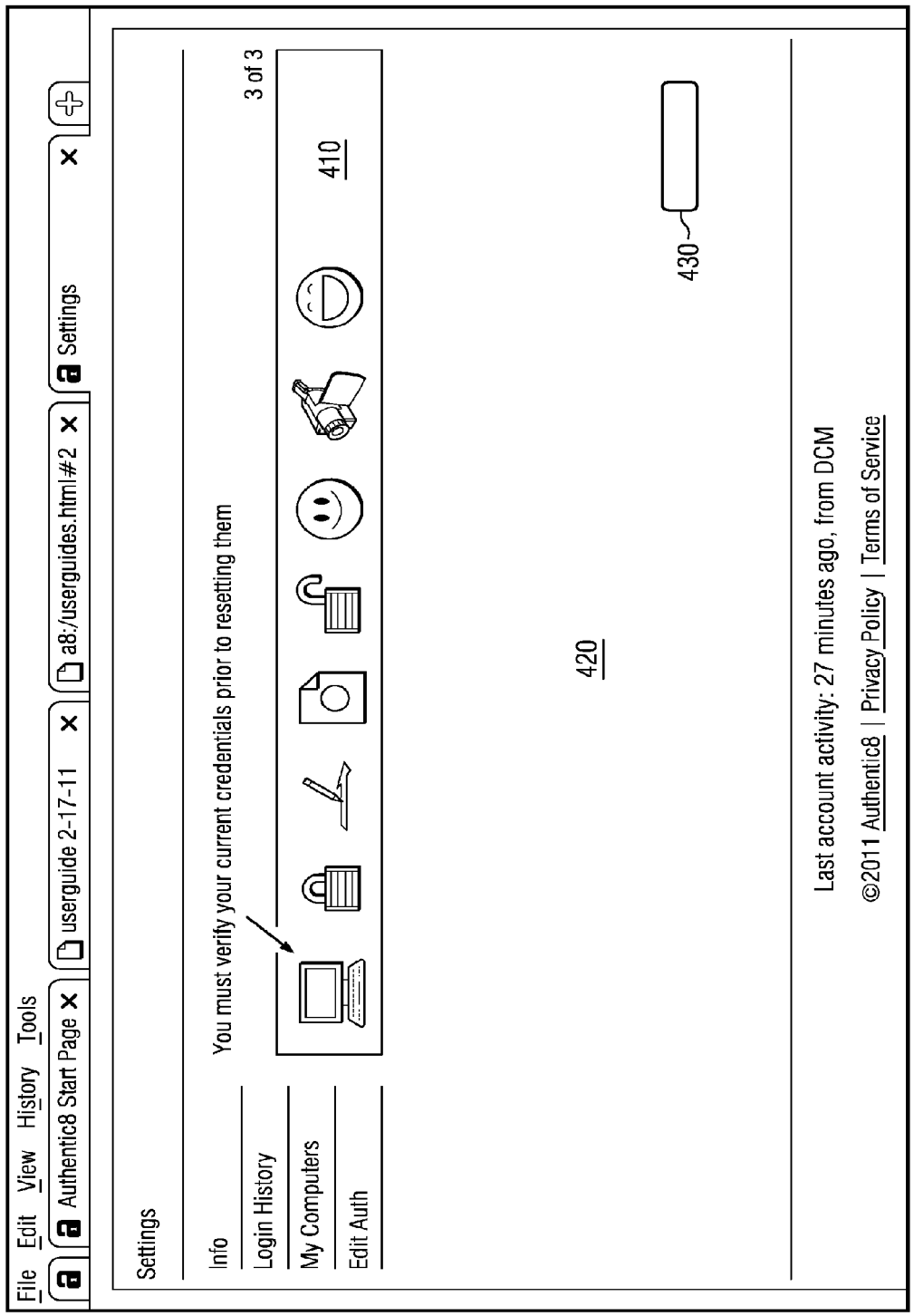

FIGS. 4A-C illustrates a user interface for interactive authentication 110. This interactive authentication process comprises the user interacting with the launched but not yet authenticated secure disposable browser 126 within the secure jail 114 contained within the authenticated service machine 120. The secure disposable browser appears as a standard web browser to the user, but rather than being software operating on the user's local machine 102, it is an application that is running on the authenticated service machine 120 within a secure jail 114 at the secure service environment 100.

The interactive authentication process 110 will be further described below, but it could be comprised of any human interface presently known or developed in the future for providing interaction between a computer and a human—visual webpage cues, keyboard or mouse input, audio cues and/or voice recognition input and supplemented with delivery of out-of-band data (e.g. via the user's mobile phone) to strengthen the authentication of the end user. The interactive authentication process 110 may be more or less involved depending on the confidence interval placed on the user's authenticity from the preceding transparent authentication process 108.

The interactive authentication process 110 also makes the assumption that inputting authentication data directly into the user's local machine 102 can lead to compromise. As a result, the interactive authentication process 110 only requires the user to input a randomly assigned and constantly changing representation of their authentication data into the user's local machine 102. This reduces the possibility that stolen system input data has long-term value since it does not correspond to the user's actual authentication data. Various applicable techniques that could be implemented within the context of the preceding figures, including FIGS. 4A-4C, are described below.

For the exemplary interactive authentication process of FIGS. 4A-4C, during initial registration to the service the user establishes a sequence of at least three random icons from a library of icons. This selected sequence of icons represents the user's interactive authentication sequence from thereon. Whenever subsequently authenticating to the secure service environment 100, the user will be presented with the interactive authentication process 110 within the secure disposable browser 126. In this process the user will be required to select (using a mouse click) the correct icons in the correct sequence from a randomly displayed subset of icons. The subset of icons displayed and the relative positioning of the user's specific icons will change randomly each time the interactive authentication process 110 is delivered. The arrow in FIG. 4A points to the first one of the sequential random icons that can be selected by a user click, whereas the arrows in FIGS. 4B and 4C point to the second and third selected icons respectively. As can be seen from the figures, these chosen icons are presented as authentication images 410 in the interactive authentication screen display 420. This method satisfies the "something you know" criterion of multi-factor authentication since it requires the user to recall specific knowledge to demonstrate authenticity.

Another type of interactive authentication process 110 would require the user to establish an x-digit PIN during registration to the service. This represents the user's interactive authentication data from thereon. Whenever subsequently authenticating to the secure service environment 100, the user will be presented with a 0-9 number line, with each number being randomly assigned or mapped to a single or double set of letters. (E.g. 0=k, 1=ef, 2=t, 3=xc etc.) The user then uses the keyboard to input the letters corresponding to the digits of his or her PIN. Furthermore, each time user enters a letter(s), the random mapping of numbers to letters changes. In this way, the system input data is never the same and the user's PIN is never directly revealed. This method satisfies the "something you know" criterion of multi-factor authentication since it requires the user to recall specific knowledge to demonstrate authenticity.

Another type of interactive authentication 110 would be to use phone-call-based authentication. The purpose of phone-call based authentication is to associate or bind a purported user's authentication session to the secure service environment 100 with a phone known to be owned by that purported user, thereby increasing the confidence that the purported user is legitimate before granting full access to the secure service environment 100. At initiation of the service, users could designate a set of phone numbers (cell, home, etc.) with the secure service environment 100. An authenticating phone call could then happen at any time during the transparent authentication or interactive authentication processes 108,110 based on environment variables and/or user defined policies. A recorded greeting played for the user could be made in the user's voice to provide comfort on the authenticity of the calling party. Answering this call and entering either a pre-defined key, PIN or password would accordingly authenticate the user. If successful, the user would then return to the web session where the authentication process will proceed automatically. This method satisfies the "something you have" criterion of multi-factor authentication since it requires the user to have possession of an identifiable item to demonstrate authenticity (namely the phone).

The above two techniques may be used in isolation or together depending on the situation and/or the confidence interval placed around the transparent authentication process 108. Phone-call based authentication may also be conditionally added in the scenario where there is no other "something you have" factor present (like a certificate on the user's local machine 102). This would reflect the scenario where a registered user is attempting to access the secure service environment 100 from a new or untrusted local machine.

As described in FIG. 2 regarding out-of-band communications 232, variants of phone-call based authentication techniques in the disclosed systems and methods include: (a) delivery via text of a one-time code to the mobile phone that the user is required to enter into the authentication process 108, 110; (b) delivery via a phone call of a one-time code that a user is required to enter into the authentication process 108, 110 (c) generation of a one-time code on the smartphone (using a dedicated application) that the user is required to enter into the authentication process 108, 110; (c) using a dedicated application on the smartphone to store/access a unique "authentication grid", comprised of random numbers arrayed by column and row and asking the user to enter a random combination into the web session (e.g. B5, K1, C3=2, 5, 8). This grid can be static, or it can dynamically refresh based on some algorithm.

Outside of the systems and methods described above, additional "something you know" mechanisms are disclosed in the embodiments herein. These additional "something you know" techniques include but are not limited to other image-based methods including:

Asking users to select images from pre-selected categories from among an array of other random pictures— example categories include planes, flowers, and people.

Asking users to select pre-determined items/regions within an image—examples are the rudder on sailboat, a third seagull from the left in a flock, the right shoe on a man, etc.

Asking users to draw a predefined image using their mouse within a N-box grid, which essentially operates like a digital signature.

Asking users to pair pictures based on some pre-defined association between specific picture or categories— examples are couplings of beds<=>boats, planes<=>castles.

Another authentication technique that could be used includes gaming concepts, specifically including using knowledge of how a user chooses to play a game as an authentication technique. As an illustrative example, it could be learned how a user moves a "Poe Man"-type character through a course or how the user plays tic-tac-toe. The games themselves could be representations of various well-known games, and they could be presented as represented in FIGS. 4A-4C as images or protocols 410 on the screen 420.

Another authentication technique that could be used at this stage includes capturing user gestures using various input devices. An example would be moving an accelerometer enabled device in x/y/z space and using the accelerometer to capture the motion, or using the finger/stylus to input a gesture in x/y space on the screen.

Other authentication techniques that could be used at this stage include word games and numerical puzzles. Users could complete pre-selected phrases as an authentication technique, and this would include the ability to craft user-specific shared secrets, phrases/quotes. The secure service environment 100 would supply half of the shared secret and the user would complete it. For numerical puzzles, users could be asked to complete simple pre-defined numerical equations as an authentication technique. Users select or define an equation with the secure service environment 100.

The pre-defined equation could contain static and dynamic parameters as well as random inputs, and the user could control the complexity of the equation. A simple exemplary equation would be "(Today's date)×(service provided random #)×(my age)"

The disclosed embodiments include the collation and selective use of the above techniques based on situational context and user preference, including based on an original confidence interval determined from the transparent authentication process 108 as well as enabling user customization of large parts of the process.

As to the user customization of this process, in the disclosed systems users are enabled to customize their choice of interactive authentication process 110 as described above, as well as to customize the situations and rules around when and how these methods are used. Following are exemplary customization methods. Users can select a "something you know" scheme from the list of many provided as well as conditionally complement it with a "something you have" scheme. Users can determine the specific elements of their selected scheme (pictures, equation, PIN, gesture, phrase, call, SMS etc). Users can create default or conditional rules for when different parts of the interactive authentication process 110 is used—examples include—"Always call my phone to authenticate me"; "Send me an SMS when you're unsure of my authenticity"; "Perform out-of-band authentication whenever I'm coming from a new machine, a new location or out of my normal hours"; "Always prompt me for authentication whenever I access www.mybank.com" etc.

Thus far the above schemes for transparent and interactive authentication processes 108, 110 have described methods to authenticate the user attempting to access the secure service environment 100. Described below are methods for the secure service environment 100 to convey its authenticity to an end user. Such methods rely on the notion that certain information about the user and the user's behavior is uniquely known by the secure service environment 100. Displaying this data to the user allows a legitimate user to have greater confidence around the authenticity of the secure service environment 100 while correspondingly increasing the difficulty for a fraudulent service to deceive the user. Examples of such data includes display of user's nickname, history of logins, map of recent login locations, accurate downstream website 153 accounts, browsing history and bookmarks etc. The user can use any or all combinations of these elements to validate the authenticity of the secure service environment 100.

FIG. 5 provides the user screen for the authenticated secure disposable browser 126 within the secure jail 114 contained within the authenticated service machine 120. This screen is provided once the user has successfully undergone transparent and interactive authentication processes 108, 110, and it shows a user's established accounts. For the established accounts shown here on this screen, the secure service environment 100 has captured and stored user credentials at the user's consent, such that a user can automatically login with one-click to his or her established accounts from any local machine 102 from which the user has accessed the secure service environment 100. The user screen also provides multiple browsing tabs as can be seen at the top, where each tab can present images representing a different downstream website 153 or web page. As previously mentioned, the user's local machine does not receive and process web code as all web code is instead processed within the secure disposable browser 126. The user's local machine 102 is accordingly dislocated from malware or other internet exploits since it is not directly exposed to the public internet.

Further regarding the security of the secure disposable browser 126, the secure service environment 100 performs integrity checking of downstream websites 153. Given that the secure service environment is operating on behalf of multiple users, it can further use collective data gathering across multiple user interactions to gain intelligence as to which downstream websites 153 are of sufficient and insufficient integrity and present users with options when faced with questionable websites. Integrity checking of downstream websites 153 comprises of three elements: (1) validating the authenticity of the website using a set of techniques including validating SSL certificates against trusted certificate authorities, performing DNS queries against known and trusted root servers, validating domains against known IP ranges for particular website destinations (2) identifying and mitigating the effects of malware on the website using a combination of heuristic and signature scanning techniques as well as employing code scanning tools, blacklists and whitelists and (3) assessing website practices with regard to handling of user data by observing website behavior around persistent and transient cookies and other user tracking elements. This collection of integrity protections would flow through the web analysis server 150 which would perform the downstream web server analysis process 152.

Figure 7:
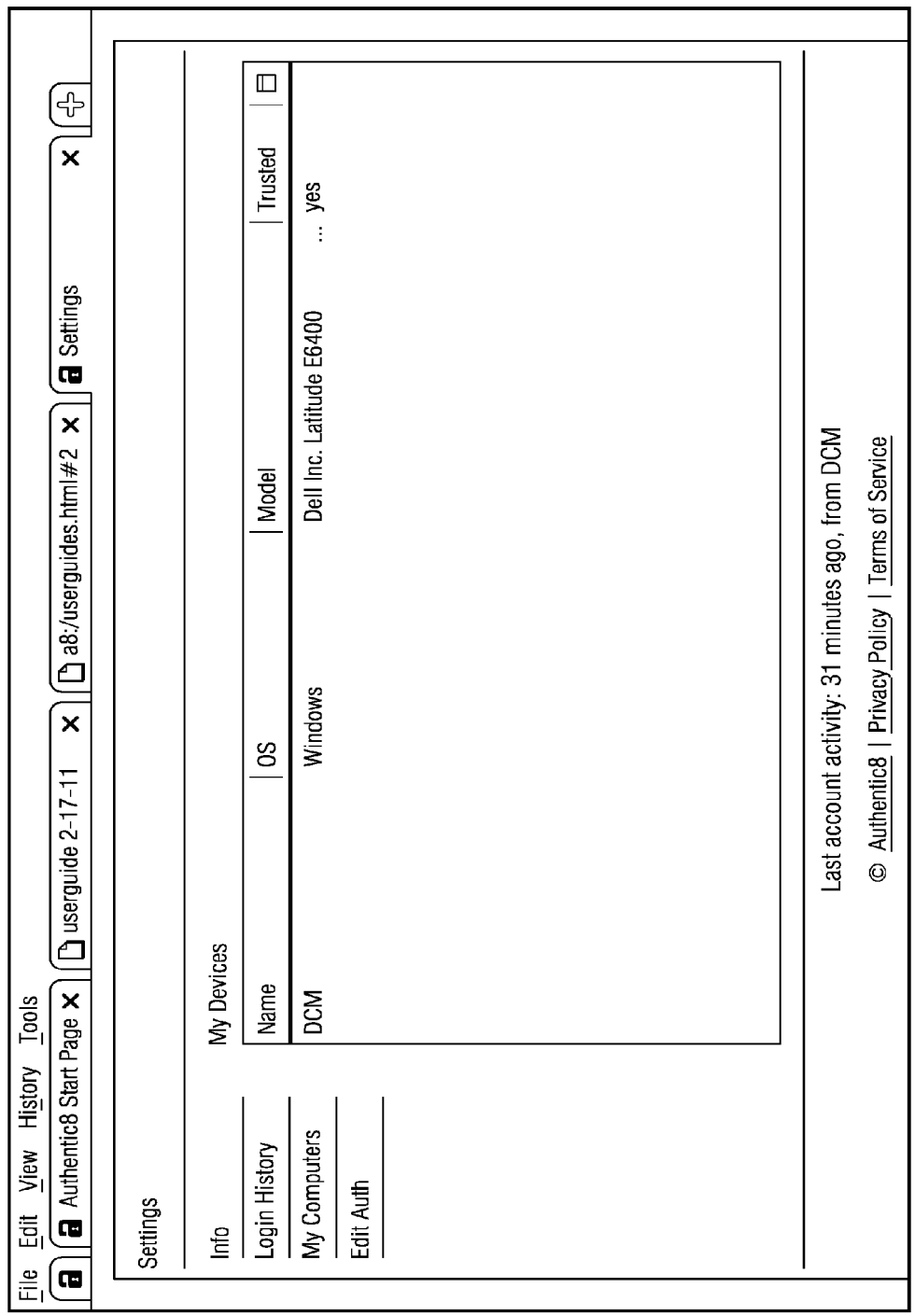
FIG. 7 illustrates a listing of a user's devices that the user has used to access the secure service environment and the state of the system's "trust" with respect to those devices.

FIGS. 6-7 provide additional screen shots that illustrate a users login history in terms of login date, identifying name of local machine, duration of the session with the secure service environment 100, trusted or untrusted nature of the user's local machine and current active session versus previously active sessions. As demonstrated here, the user can access the secure service environment 100 from any internet accessible machine. Moreover, the user can then also optionally choose to trust, untrust or delete certain machines that they have used to access the secure service environment 100. The consequence of trusting or untrusting a machine determines the incremental steps and sequencing required during the transparent and interactive authentication processes 108, 110 when accessing the secure service environment 100. For example, when accessing the service from an untrusted, deleted or previously never used machine, the secure service environment 100 will perform out-of-band authentication during the transparent authentication process 108, and also prompt for the interactive authentication process 110 immediately upon accessing the secure disposable browser 126. In contrast, when accessing the secure service environment 100 from a trusted machine, the user may bypass out-of-band authentication altogether and only be required to perform interactive authentication 110 within the secure disposable browser 126 when attempting to access or modify user data.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations. Although various computer elements have been illustrated herein as single computer servers or machines, such elements may operate over several different physical machines, or they may be combined as operating code instances running on a single physical machine. The claims in the present application comprehend such variation in physical machine configurations Various computer elements have been illustrated herein as single computer servers or machines, such elements may operate over several different physical machines, or they may be combined as operating code instances running on a single physical machine. The claims in the present application comprehend such variation in physical machine configurations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A secure system for providing user interaction with online services, a user accessing the secure system through a local client machine, the secure system comprising:
    a user authentication memory comprising user authentication indicators and computer instructions for performing user authentication;
    a web authentication server in communication with the user authentication memory; and
    an application server comprising a hardware processor associated with a computing device, said hardware processor programmed to provide a secure browser application operable to configure a secure access channel to remotely control a secure disposable browser using a local client machine, the secure browser application being further operable to:
        receive a result determined by the web authentication server, the result based upon data received from a thin client process running on the local client machine;
        generate data for passing to the local client machine, the data for instructing the thin client process to access the secure disposable browser;
        provide the generated data from the application server to the local client machine using a secure access channel, the secure access channel for controlling the secure disposable browser;
        receive web code commands from an online service provider site;
        translate the received web code commands into an image protocol for transmission via the secure access channel to the local client machine;
        receive user-generated inputs via the secure access channel; and
        process the user-generated inputs via the secure disposable browser, such that the user-generated inputs are passed via the secure disposable browser to the online service provider site;
    whereby the application server configures the secure access channel to the local client machine to display the image protocol as images representative of accessed web pages displayed by the local client machine, the images displayed without the local client machine receiving the web code commands from the online service provider site, such that control of the secure disposable browser via images through use of the secure access channel by the local client machine operates to allow the execution of the web code within the secure system rather than the local client machine; and the application server being further operable to establish private user areas, wherein the private user areas can be established and/or disposed of within the secure system, thereby protecting user data from unauthorized access.

2. The secure system according to claim 1, further comprising:
    a policy database memory comprising usage policies for multiple users;
    a policy portal server connected to the policy database memory and accessible by an administrator to set security policies for one or more users of the secure system.

3. The secure system according to claim 2, wherein the administrator is one of the one or more users, whereby the administrator is enabled to set his own user security policies.

4. The secure system according to claim 2, wherein the administrator can set certain usage policies on behalf of individual user accounts or globally for multiple users.

5. The secure system according to claim 1, wherein the web authentication server employs dynamic authentication procedures in accordance with detected environmental variables associated with the local client machine from which the user is accessing the secure system.

6. The secure system according to claim 5, wherein the dynamic authentication procedures change randomly, such as to avoid automated attacks.

7. The secure system according to claim 1, wherein the private user areas comprise disposable browsers that perform the accessing of the online service provider site.

8. The secure system of claim 1, wherein the user may access the secure system initially through a standard local browser running on the user's local machine.

9. The secure system of claim 8, wherein the standard local browser initially accesses the secure system via an encrypted HTTPS connection, wherein the encrypted HTTPS connection connects to a web authentication server within the secure service environment.

10. A method for providing user interaction with online services within a secure system provided to a local client machine using a configured secure access channel, the method comprising:
    receiving a result determined by an authentication server, the authentication server comprising a hardware processor associated with a computing device, the result determined based upon data from a thin client process running on a local client machine;
    generating data for passing to the local client machine, the data constituting session file contents for instructing the thin client process to access an application server comprising a secure browser application;
    configuring a secure access channel based on indications received in response to the passed session file contents, the secure access channel operable to provide an interface for the local client machine to control the secure browser application using a protocol that is restricted to providing display data to the local client machine and to receiving user input data from the local client machine;
    receiving, at the secure browser application, web code commands from an online service provider site;
    translating the received web code commands into display data comprising an image protocol for transmission via the configured secure access channel to the local client machine;

enabling the local client machine to transmit the user-generated inputs and to display the images representative of accessed web pages;

receiving user-generated inputs via the secure access channel; and passing the inputs via the secure browser application to the online service provider site;

whereby control of the secure browser via images through use of the secure access channel by the local client machine operates to allow the execution of the web code within the secure system rather than the local client machine.

11. The method of claim 10, further comprising storing user credentials for the online service provider site and using the user credentials to login to the online service provider site on behalf of users.

12. The method of claim 11, further comprising resetting a user's credentials with the online service provider site to provide further security of the user's access to the site.

13. The method of claim 10, further operable to validate the online service provider site and to provide access to, deny access to, or provide information to users about the online service provider site in accordance with usage policies stored in a policy database.

14. The method of claim 10, further comprising employing dynamic authentication procedures in accordance with detected environmental variables associated with the local client machine from which the user is accessing the secure system.

15. The method of claim 14 wherein the dynamic authentication procedures change randomly, such as to avoid automated attacks.

16. The secure system of claim 10, wherein the user may access the secure system initially through a standard local browser running on the user's local machine.

17. The secure system of claim 16, wherein the standard local browser initially accesses the secure system via an encrypted HTTPS connection, wherein the encrypted HTTPS connection connects to a web authentication server within the secure service environment.

18. A secure system for providing user interaction with online services, a user accessing the secure system through a local client machine, the secure system comprising:

a user authentication memory comprising user authentication indicators and computer instructions for performing user authentication;

a web authentication server in communication with the user authentication memory the web authentication server for determining a result based upon data received from a thin client process running on a local client machine; and an application server comprising a hardware processor associated with a computing device, said hardware processor programmed to provide a secure browser application, the secure browser application operable to provide an interface for the local client machine to remotely control the secure browser using a secure access channel configured between the local client machine and the application server, the secure browser application being further operable to translate the web code commands into an image protocol for transmission through the configured secure access channel to the local client machine, the application server being further operable to build, on-demand, instantiated user sessions that are operated outside the local client machine and are remotely controlled by the local client machine using the configured secure access channel, such that the application server provides images representative of accessed web pages for display by the local machine without the application server providing the web code commands from the online service provider site to the local client machine, such that providing control of the secure disposable browser via images through use of the secure access channel by the client machine operates to allow the execution of the web code within the secure system rather than the local client machine, and whereby the on-demand user sessions can be deleted upon termination of the instantiated user sessions; and the application server being further operable to establish private user areas, wherein the private user areas can be established and/or disposed of within the secure system, thereby protecting user data from unauthorized access.

19. The secure system according to claim 18, further comprising:

a policy database memory comprising usage policies for multiple users;

a policy portal server connected to the policy database memory and accessible by an administrator to set security policies for one or more users of the secure system.

20. The secure system according to claim 19, wherein the administrator is one of the one or more users, whereby the administrator is enabled to set his own user security policies.

21. The secure system according to claim 19, wherein the administrator can set certain usage policies on behalf of individual user accounts or globally for multiple users.

22. The secure system according to claim 18, wherein the web authentication server employs dynamic authentication procedures in accordance with detected environmental variables associated with the local client machine from which the user is accessing the secure system.

23. The secure system according to claim 22, wherein the dynamic authentication procedures change randomly, such as to avoid automated attacks.

24. The secure system according to claim 18, wherein the private user areas comprise disposable browsers that perform the accessing of the online service provider site.

25. The secure system of claim 18, wherein the user may access the secure system initially through a standard local browser running on the user's local machine.

26. The secure system of claim 25, wherein the standard local browser initially accesses the secure system via an encrypted HTTPS connection, wherein the encrypted HTTPS connection connects to a web authentication server within the secure service environment.

* * * * *